(12) United States Patent
Briscoe et al.

(10) Patent No.: US 7,948,878 B2
(45) Date of Patent: May 24, 2011

(54) POLICING NETWORKS

(75) Inventors: Robert J Briscoe, Woodbridge (GB); Arnaud Jacquet, Ipswich (GB); C Di Cairano-Gilfedder, Felixstowe (GB); Alessandro Salvatori, La Spezia (IT)

(73) Assignee: British Telecommunications plc, London (GB)

( * ) Notice: Subject to any disclaimer, the term of this patent is extended or adjusted under 35 U.S.C. 154(b) by 521 days.

(21) Appl. No.: 11/795,949

(22) PCT Filed: Feb. 7, 2006

(86) PCT No.: PCT/GB2006/000417
§ 371 (c)(1),
(2), (4) Date: Jul. 25, 2007

(87) PCT Pub. No.: WO2006/082443
PCT Pub. Date: Aug. 10, 2006

(65) Prior Publication Data
US 2008/0192636 A1    Aug. 14, 2008

(30) Foreign Application Priority Data

Feb. 7, 2005  (GB) .................................. 0502483.1
Aug. 22, 2005  (EP) .................................... 05255164

(51) Int. Cl.
*H04L 12/26* (2006.01)
(52) U.S. Cl. .................................................... 370/229
(58) Field of Classification Search .................... None
See application file for complete search history.

(56) References Cited

U.S. PATENT DOCUMENTS

| 6,266,327 | B1 * | 7/2001 | Hernandez-Valencia | 370/252 |
| 6,724,721 | B1 * | 4/2004 | Cheriton | 370/229 |
| 6,839,321 | B1 * | 1/2005 | Chiruvolu | 370/230.1 |
| 6,865,185 | B1 * | 3/2005 | Patel et al. | 370/412 |
| 6,898,182 | B1 * | 5/2005 | Cloonan | 370/232 |
| 7,027,393 | B1 * | 4/2006 | Cheriton | 370/230.1 |
| 7,092,357 | B1 * | 8/2006 | Ye | 370/230 |
| 7,295,516 | B1 * | 11/2007 | Ye | 370/232 |
| 2003/0007454 | A1 * | 1/2003 | Shorey | 370/229 |
| 2003/0081546 | A1 * | 5/2003 | Agrawal et al. | 370/229 |
| 2005/0276219 | A1 * | 12/2005 | Wang et al. | 370/229 |

(Continued)

FOREIGN PATENT DOCUMENTS

WO   WO 03/049319 A1   6/2003

(Continued)

OTHER PUBLICATIONS

International Search Report for PCT/GB2006/000417 mailed Apr. 18, 2006.

(Continued)

*Primary Examiner* — Kevin C Harper
(74) *Attorney, Agent, or Firm* — Nixon & Vanderhye PC

(57) ABSTRACT

Flow in a data network is policed by determining a measure of greediness of a flow through a node, comparing the measure of greediness with a measure indicative of acceptable greediness dependent on the expected greediness of a compliant flow experiencing substantially similar path conditions, and designating the flow for possible sanction in the event that the greediness is not in accordance with the acceptable greediness. Such allows for the policing of a data network when one or more fields in a data packet that carry information relating to a characterization of an end-to-end path and/or a downstream path of the data packet are used in order to police the data network.

29 Claims, 8 Drawing Sheets

Path-specific policer

U.S. PATENT DOCUMENTS

2007/0076606 A1* 4/2007 Olesinski et al. ............ 370/230

FOREIGN PATENT DOCUMENTS

| WO | WO 2005/032068 A1 | 4/2005 |
| --- | --- | --- |
| WO | WO 2005/096566 A1 | 10/2005 |
| WO | WO 2005/109783 A1 | 11/2005 |

OTHER PUBLICATIONS

Nikolouzou et al., "Network services definition and deployment in a differentiated services architecture," 2002 IEEE International Conference on Communications, vol. 1 of 5, Apr. 28, 2002, pp. 1057-1062, XP010589653.

International Search Report mailed Apr. 18, 2006 in International Application No. PCT/GB2006/000417.

European Search Report mailed Jan. 26, 2006 in Application No. 05255164.5.

Nikolouzou et al., "Network Services Definition and Deployment in a Differentiated Services Architecture," IEEE International Conference on Communications, 2002, 6 pages.

Clerget et al., "TUF: Tag-Based Unified Fairness," IEEE INFOCOM 2001, 10 pages.

Raisinghani et al., "Analysis of Receiver Window Control in Presence of a Fair Router," IEEE Intl. Conf. on Personal and Wireless Communications, Jan. 2005, 3 pages.

Padhye et al., "Modeling TCP Throughout: A Simple Model and its Empirical Validation," Proc. ACM SIGCOMM, 1998, 12 pages.

Floyd et al., "Equation-Based Congestion Control for Unicast Applications," Proc. ACM SIGCOMM, Aug. 2000, pp. 1-14.

Kelly et al., "Rate Control for Communication Networks: Shadow Prices, Proportional Fairness and Stability," Journal of the Operational Research Society, 1998, 49(3), pp. 1-20.

Floyd et al., "Promoting the Use of End-to-End Congestion Control in the Internet," IEEE/ACM Transactions on Networking, May 3, 1999, pp. 1-16.

Pan et al., "CHOKe A Stateless Active Queue Management Scheme for Approximating Fair Bandwidth Allocation," Jun. 12, 1999, pp. 1-20.

Crowcroft et al., "Differentiated End-to-End Internet Services Using a Weighted Proportional Fair Sharing TCT," Computer Communications Review, Jul. 1998, 17 pages.

Van Jacobson et al., "Congestion Avoidance and Control," Proc. ACM SIGCOMM'88, Computer Communication Review, Nov. 1988, pp. 1-21.

Siris, "Resource Control for Elastic Traffic in CDMA Networks," Proc. ACM International Conference on Mobile Computing and Networks (MobiCom'02), Sep. 2002, 12 pages.

ITU-T Recommendation I.371, "Traffic Control and Congestion Control in B-ISDN," Mar. 2004, pp. 1-125.

Jain et al., "Quick-Start for TCP and IP," Ietf Internet Draft, Sep. 2004, pp. 1-55.

Katabi et al., "Congestion Control for High Bandwidth-Delay Product Networks," ACM SIGCOMM'02, Computer Communication Review, Oct. 2002, 14 pages.

Ott et al., "SRED: Stabilized RED," IEEE Conference on Computer Communications (Infocom'99), Mar. 1999, pp. 1-10.

Mahaj an et al., "Controlling High-Bandwidth Flows at the Congested Router," Proc. IEEE International Conference on Network Protocols (ICNP'01), 2001, pp. 192-201.

Reddy, "LRU-RED: An Active Queue Management Scheme to Contain High Bandwidth Flows at Congested Routers," Proc. Globecomm'01, Nov. 2001, 5 pages.

Pan et al., "Approximate Fairness Through Differential Dropping," Computer Communication Review, 33(2), Apr. 2003, pp. 1-18.

Chhabra et al., "XCHOKE: Malicious Source Control for Congestion Avoidance at Internet Gateways," Proceedings of the 10th IEEE International Conference on Network Protocols (ICNP'02), 2 pages.

Jiang et al., "Passive Estimation of TCP Round-Trip Times," ACM SIGCOMM Computer Communications Review, vol. 32, No. 3, Jul. 2002, pp. 75-88.

* cited by examiner

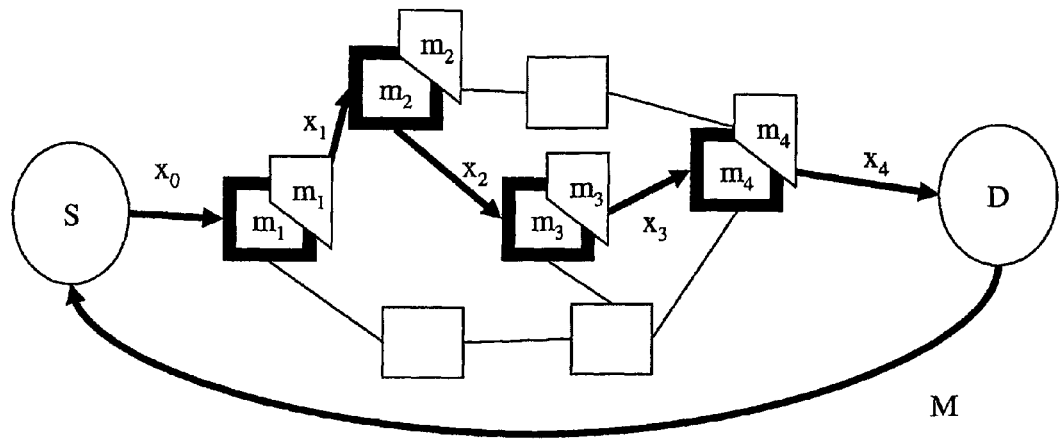
Fig 1(a): Bottleneck policer
(Prior Art)
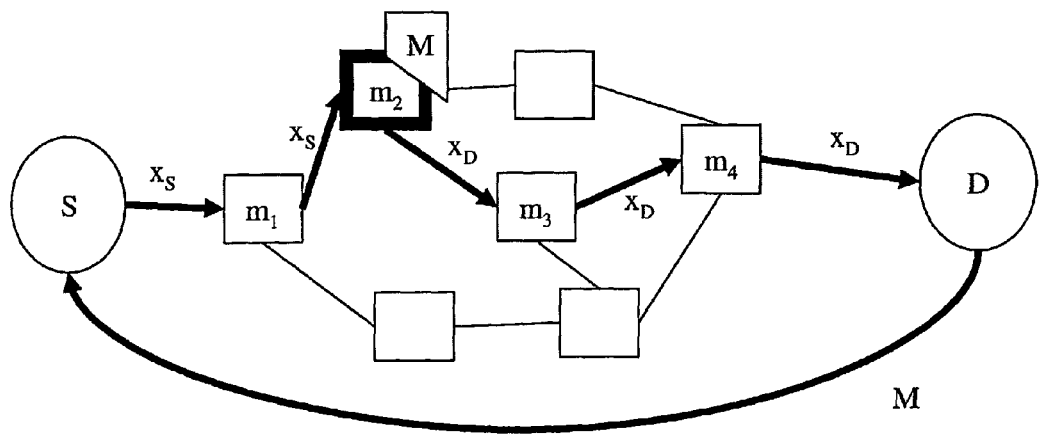
Fig 1(b): Path-specific policer
Key: $\boxed{m_i}$ = Router with local congestion $m_i$
M = end-to-end congestion
$\boxed{m_i}^{y}$ = Router with local congestion $m_i$ policing traffic with respect to metric y

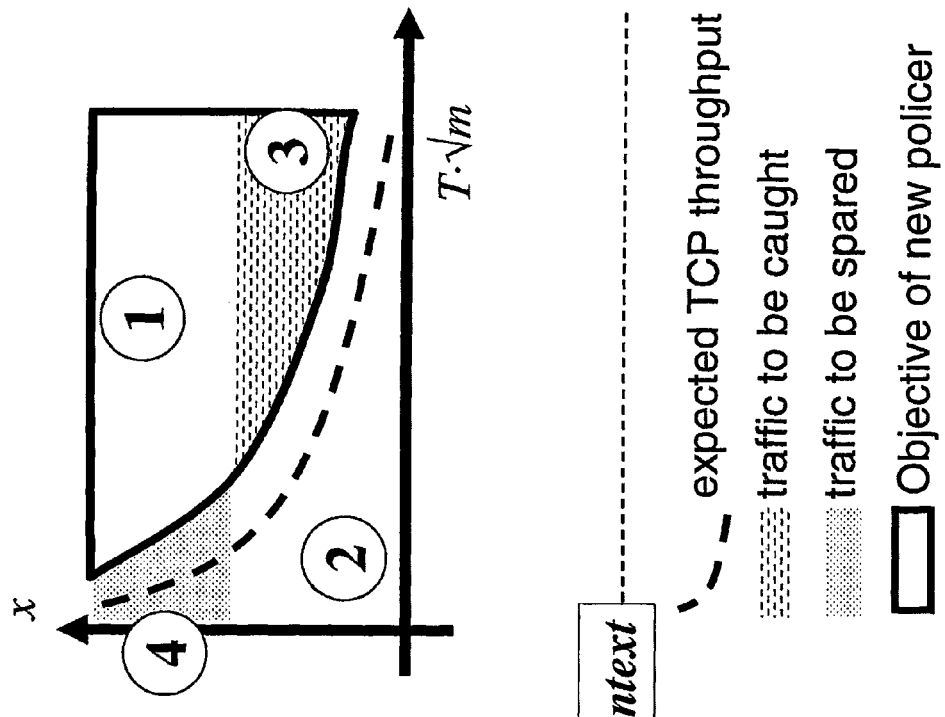
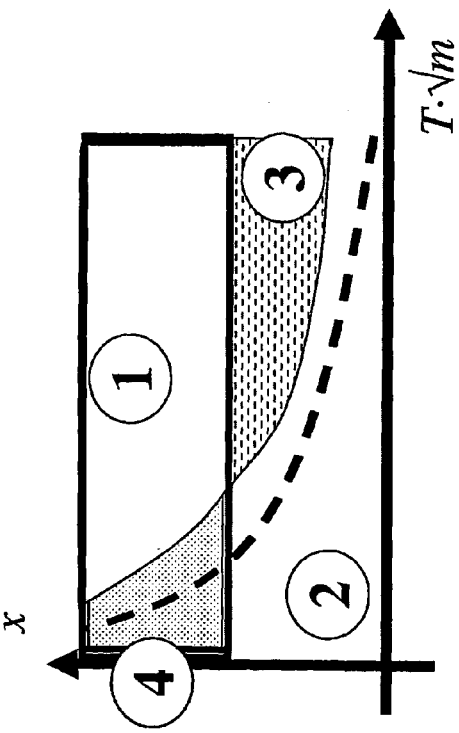
Fig 2(a): Classic policer (Prior Art)
Fig 2(b): Path-specific policer

POLICING NETWORKS

This application is the US national phase of international application PCT/GB2006/000417 filed 7 Feb. 2006, which designated the U.S. and claims benefit of GB 0502483.1, dated 7 Feb. 2005, and EP 05255164.5, dated 22 Aug. 2005, the entire contents of all of which are hereby incorporated by reference.

BACKGROUND

1. Technical Field

The present invention relates primarily to the control of data in a network, and to methods and systems for enabling the policing of use of networks such as the Internet for communicating data.

2. Related Art

Importance of Responsible Reaction to Network Congestion

The current Internet architecture is often criticized for trusting hosts to respond voluntarily to congestion; an oversight commonly put down to the environment of mutual trust in which these algorithms emerged. Unresponsive applications can effectively steal whatever share of bottleneck resources they need from responsive flows. Although it is believed that the large majority of current sources behave well, free-riding is more than just irritating. At the most alarmist, without knowing what makes the current co-operative consensus stable, we may unwittingly destabilize it, leading to congestion collapse with no way back. But a more gradual erosion threatens the Internet's viability, because unresponsive applications require more capacity investment per average bandwidth. New Quality of Service ("QoS") products that manage congestion properly will never be viable if anyone can take whatever they want anyway, without contributing to the investment needed. But investment in these new services will be too risky, creating a gap for even more misbehaving applications. So well-behaved applications will be trapped within a vicious circle of under-investment and misbehavior.

Some applications need to be unresponsive (e.g. interactive voice, video and games). Others simply choose to be aggressive to give themselves premium service. Also, some users continuously fill their access link with more flows than others, whether deliberately (peer-to-peer file sharing) or unwittingly (worm infected zombie hosts). Even if each flow is responsive, in total more congestion results.

Characterization of Rate Adaptation Policies

The TCP rate control algorithm [7] was developed in the late 1980s in response to a major congestion collapse on the Internet. It was designed to ensure that the rate of every flow traversing the Internet rapidly adapted to the level of congestion it experienced in such a way that each flow would tend towards a rate that shared capacity of any congested router or link fairly.

The TCP rate control algorithm runs within the operating system of the sending host. The programmer of an application can choose to use it or not. Programmers of applications that cannot tolerate rapid variation of bit rate, such as interactive voice or video applications, invariably choose not to use it.

Originally the TCP algorithm characterised the path being used across the Internet by detecting losses through missing acknowledgements and by measuring the round trip delay before those acknowledgements arrived. Recently, the TCP/IP standard was improved by the optional addition of Explicit Congestion Notification (ECN), so that a router experiencing early signs of congestion could mark packets before forwarding. The acknowledgement protocol was also changed to allow these marks to be conveyed back to the source. The standard for the TCP algorithm was altered to require the sending host to respond to these returned marks as if there had been a loss.

Among many others, Padhye et al [1] have developed a formula for the long-term average of TCP flows in steady-state, which is used in particular as the guidance for the rate adjustment of TCP-Friendly Rate Control (TFRC, a rate-based version of TCP's window-based mechanism, only with smoother adaptation) [2]. When congestion remains small (m<<0.2), this value can be approximated to the square-root law, as given in Equation (1)

$$x = \frac{k \cdot s}{T \cdot \sqrt{m}} \quad (1)$$

where x is the expectation of the throughput, k is a constant of the order of $\sqrt{(3/2)}$, s is the packet size for the flow, T is its round-trip-time, and m is the end-to-end congestion metric (as represented by the proportion of marked and dropped packets within the flow).

There exist other models for the allocation of congested network resources among concurrent flows. For instance, Crowcroft and Oechslin [6] showed how easy it was to use more capacity than others by writing a version of TCP called MulTCP with a weight parameter ω that would mimic ω parallel TCP flows. Kelly et al [3] have developed a rate control algorithm based on an economic optimisation of utilization of a network where Internet users define their own willingness-to-pay for the traffic they generate. Users effectively adopt a rate adaptation policy in order to maintain a constant spending rate over the course of the data transfer irrespective of the amount of data exchanged. The congestion status of the data path will cause the transfer duration to shrink and stretch dynamically. Such a policy is characterised by a throughput equation given in Equation (2):

$$x = \frac{w \cdot s}{m} \quad (2)$$

where x, m, and s have the same meaning as above while w is the willingness-to-pay parameter of the user.

All these rate control algorithms depend on metrics of the path over which the transmission is conveyed. For whatever metric, whether loss, explicit congestion or round trip delay, the current arrangements for characterizing the metric depend on the truthful compliance of both the receiver and the sender in a protocol designed to limit the rate with which they can communicate. Whole path congestion only emerges at the destination to be fed back from receiver to sender in a back-channel. But, in any data network, back-channels need not be visible to relays, as they are essentially communications between the end-points (they may be encrypted, or asymmetrically routed, or omitted entirely). So no network element can reliably intercept them. An earlier patent application by the present applicant related to a rate control mechanism that runs on network equipment intercepting acknowledgements passing back to the sender (see WO 03/049319), which has been embodied in a cellular radio network controller described in a paper later published by Siris [8]). However, such mechanisms ultimately rely on the receiver allowing its feedback to be visible and truthfully declaring path characteristics within it. Even then, the sender must also be relied upon to alter its rate correctly in response to path congestion and delay.

[1] J. Padhye, V. Firoiu, D. Towsley, and J. Kurose, "Modeling TCP Throughput: A Simple Model and its Empirical Validation", Proc ACM SIGCOMM 1998.

[2] S. Floyd, M. Handley, J. Padhye and J. Widmer, "Equation-Based Congestion Control for Unicast Applications". Proc. ACM SIGCOMM. August 2000.

[3] F. P. Kelly, A. K. Maulloo, and D. K. H. Tan, "Rate control for communication networks: shadow prices, proportional fairness and stability", Journal of the Operational Research Society, 49(3):237-252, 1998.

[6] Jon Crowcroft and Philippe Oechslin, "Differentiated End to End Internet Services using a Weighted Proportional Fair Sharing TCP," In: Computer Communication Review 28 pp. 53-69 (July, 1998).

[7] Van Jacobsen. Congestion avoidance and control. Proc. ACM SIGCOMM '88, Computer Communication Review, 18(4):314-329, 1988.

[8] Vasilios A. Siris. Resource control for elastic traffic in CDMA networks. In Proc. ACM International Conference on Mobile Computing and Networks (MobiCom '02), URL: http://www.ics.forth.gr/netlab/wireless.html, September 2002. ACM.

Rate Policing

In the current Internet, should senders stop complying with the reaction mechanism specified in the TCP standard, it would create havoc on the network. This is why several proposals have been developed for policing flows so users don't abuse their ability to send any rate of traffic over the network.

As was explained above, an Internet network element cannot currently know the relevant metrics about the path to verify that a sender is complying with the TCP protocol. Commercially available policers (e.g. from Sandvine (www.sandvine.com), or Riverhead Networks (www.riverhead.com) ensure that no flow exceeds a maximum rate, irrespective of the condition of each path being used through the rest of the network. Some such policers can use their knowledge of any local congestion on the equipment itself, but not elsewhere.

Indeed proposed policers that reduce the amount of state required by these commercial policers [4, 5, 12, 13, 14, 15, 16] must be sited on relays that are congested themselves in order to work. All these policers, which we will refer to as "bottleneck policers", detect unusually high bit rates, but a high sending rate might be perfectly legitimate if the path is uncongested or the round-trip time is short. Similarly, other policers on the latest broadband remote access servers enforce monthly volume caps in an attempt to control high volume file-sharing. But they punish traffic that fills troughs as much as traffic that causes peaks in utilization.

Floyd and Fall [4] have proposed a penalty box mechanism based on the random early detection (RED) mechanism. RED is a widely used queue management mechanism on Internet routers, where the longer the output queue to the line, the higher is the probability of dropping (or marking if ECN is enabled) packets arriving at the queue. Their idea is to monitor the drop history of the RED algorithm. Any flow that predominates in the drop history after a long enough period is considered misbehaving, blacklisted and submitted to the appropriate sanction (dropping, declassing . . . ). CHOKe [5] also exploits the idea that a grossly misbehaving flow will appear far more in the data stream than a compliant TCP flow. Whenever a packet arrives, it is compared with another randomly picked from the queue. If the two are from the same flow, that flow is suspected of misbehaving. CHOKe shows very good results in forcing down unusually high rate traffic.

Many research proposals have made incremental improvements on techniques for rate policing initially proposed by Floyd and Fall [4]. Stabilized RED (SRED [12]) was published in parallel, while later improvements include CHOKe [5], RED with Preference Dropping (RED-PD [13]), Least Recently Used RED (LRU-RED [14]), XCHOKe [16], and Approx. Fair Dropping (AFD [15]).

However in all cases, rate is policed with no respect to the specific characteristics of the path. For instance, let us consider two flows crossing a common bottleneck: flow A with a short round-trip time passes over an otherwise barely congested path while flow B has a round trip-time four times as long and experiences four times as much congestion on its path. In the long-term, flow B should get only ⅛ of the bandwidth flow A gets. Nevertheless, with all existing policers, if congestion is elsewhere than on the network element housing the policer itself, both packets will be considered equally responsible, and flow A will therefore be much more likely to be constrained than flow B.

Clerget & Dabbous [17] have proposed another type of distributed rate policing. In their proposed framework "Tag-based Unified Fairness" (TUF), bottlenecks police traffic so that flows of a given type all get the same share of the bottleneck bandwidth. The TUF approach is capable of ensuring intra-class fairness but not inter-class fairness: if n_TCP TCP flows and n_UDP UDP flows share a bottleneck, each TCP flows will get a share x_TCP and each UDP flow will get a share x_UDP so that $$n\_TCP*x\_TCP+n\_UDP*x\_UDP=C$$

where C is the forwarding capacity of the node, however x_TCP I=x_UDP for any level of congestion other than two very specific levels. Further to not achieving inter-class fairness, the TUF approach also exhibits the weaknesses of bottleneck policers.

Also in the prior art, Raisinghani & Iyer [18] discloses a mechanism whereby a receiver dynamically prioritizes its flows by controlling the achievable congestion window they should aim for, assuming drops are all caused on the final wireless section of the path. It appears that this relates to the problem of inter-flow congestion control, and that the receiver tampers with the congestion signal in order to adjust priorities between its flow. This document includes a discussion of RED-DT, which is another single-bottleneck fairness optimisation on RED. The optimisation only relies on local information (i.e. local with respect to the node concerned), such as queue lengths, buffer size, and a number of per-flow variables all specific to the node.

A further prior art document, Nikolouzou et al [19] describes a generic Differentiated Services (DiffServ) arrangement, and addresses the definition and deployment of specific network services in a DiffServ environment.

Recently, proposals have been made to enable the rate control algorithm of a data source to quickly find out how fast it can send data across a high capacity network. In these proposals, the source places a request in a protocol field. In XCP [11], the request is in terms of how much data can be sent before any acknowledgement has been received (termed the amount of data in flight, or the congestion window). In Quick-Start [10], the field is in terms of sending rate. As a packet traverses the network, if the value of the metric that a router can tolerate is less than the request, it re-writes the field. However, the resulting field must still be returned to the sender, and the sender must ensure its future rate complies with the network's response to its request. So both schemes still depend on the co-operation of sender and receiver against their own interests. The router could remember the response it had given on the previous round, and check a source complied next time, however, this would require flow state to be held on routers, losing the benefits of the stateless connectionless model of packet forwarding characteristic of the Internet.

In connection-oriented networks, such as ATM, network elements send congestion back-pressure messages [9] along each connection, duplicating any end-to-end feedback because they don't trust it. But it is inherently hard to use similar techniques in a connectionless datagram network without losing the benefits of low connection set-up latency and robustness of a packet network.

In a co-pending application filed by the present applicant having publication number WO2005/096566 (U.S. Ser. No. 10/593,423), the subject matter of which is incorporated herein by reference, a novel feedback mechanism was proposed termed "re-feedback", this term being indicative of the idea of "Receiver-Normalised" feedback. According to the re-feedback mechanism, the sender sets the initial value of any path characterization field so that, by the time it has accumulated path information, it tends to arrive at the destination set to a commonly standardised value. Feedback from the destination to the source is then used to continuously correct any error in the destination value when future data is sent. A principal advantage is that data effectively carries with it a "prediction" of its own downstream path for use by in-line equipment along the transmission path.

Further, in another co-pending application filed by the same applicant having publication number WO2005/109783 (U.S. Ser. No. 11/579,374), the subject matter of which is also incorporated herein by reference, a novel dropping policer was proposed that would intercept traffic to ensure the downstream path metrics (e.g. congestion or delay) within packets were not persistently negative. It used sanctions such as packet truncation or discarding. Together, embodiments of the inventions of these two applications may be used to ensure that the sender must "pre-load" a sufficiently high value into the path metric fields of each packet so that they remain positive even after having been decremented in proportion to the congestion and delay experienced during transmission across an inter-network.

[4] S. Floyd and K. Fall, "Promoting the Use of End-to-End Congestion Control in the Internet", IEEE/ACM Transactions on Networking, May 1999.

[5] R. Pan, B. Prabhakar, and K Psounis. "CHOKe—A stateless active queue management scheme for approximating fair bandwidth allocation".

[9] "Traffic control and congestion control in B-ISDN". Recommendation I.371 (03/04), ITU-T, URL: http://www.itu.int/rec/recommendation.asp?type=folders&lang=e&parent=T-REC-I.371, March 2004.

[10] Amit Jain, Sally Floyd, Mark Allman, and Pasi Sarolahti. "Quick-Start for TCP and IP". Internet Draft draft-amitquick-start-03, Internet Engineering Task Force, URL: http://www.icir.org/floyd/quickstart.html, September 2004. (Work in progress).

[11] Dina Katabi, Mark Handley, and Charlie Rohrs. "Congestion control for high bandwidth-delay product networks". Proc. ACM SIGCOMM '02, Computer Communication Review, 32(4):89-102, October 2002.

[12] Teunis J. Ott, T. V. Lakshman, and Larry H. Wong. "SRED: Stabilized RED". In Proc. IEEE Conference on Computer Communications (Infocom '99), pages 1346-1355, URL: http://citeseer.nj.nec.com/ott99sred.html, March 1999. IEEE.

[13] Ratul Mahajan, Sally Floyd, and David Wetheral. "Controlling high-bandwidth flows at congested router". In Proc. IEEE International Conference on Network Protocols (ICNP '01), URL: http://citeseer.nj.nec.com/545435.html, 2001.

[14] Smitha A. L. Narasimha Reddy. "LRU-RED: An active queue management scheme to contain high bandwidth flows at congested routers". In Proc Globecomm '01, URL: http://citeseer.nj.nec.com/473674.html, November 2001.

[15] Rong Pan, Lee Breslau, Balaji Prabhaker, and Scott Shenker. "Approximate fairness through differential dropping". Computer Communication Review, 33(2):23-40, April 2003.

[16] P Chhabra, S Chuig, A Goel, A John, A Kumar, H Saran and R Shorey. "XCHOKE: Malicious Source Control for Congestion Avoidance at Internet Gateways". Proc. ICNP, November 2002.

[17] Antoine Clerget & Walid Dabbous: "TUF: Tag-based Unified Fairness", Proceedings of IEEE INFOCOM Conference on Computer Communications, April 2001.

[18] Vijay Raisinghani & Sridhar Iyer: "Analysis of receiver window control in the presence of a fair router", IEEE Intl. Conf. on Personal and Wireless Communications, January 2005.

[19] Nikolouzou, Maniatis, Sampatakos, Tsetsekas & Venieris: "Network Services Definition and Deployment in a Differentiated Services Architecture", IEEE Intl. Conf. on Communications 2002.

BRIEF SUMMARY

As explained above, according to existing policing methods, rate is policed with no respect to the specific characteristics of the path. By virtue of this, existing policers deny themselves opportunities for optimising certain policing characteristics, including their responsiveness (i.e. ability to detect misbehaving flows quickly), their robustness (i.e. ability to identify as misbehaving as few compliant flows as possible, thus avoiding "false positives"), and in particular the trade-off between characteristics such as these.

According to a first aspect of the present invention, there is provided method of policing flow in a data network, said data network providing a network service having an associated reference rate adaptation policy, said method comprising steps of:
  determining a measure of greediness of a flow through a node;
  comparing said measure of greediness with a measure indicative of acceptable greediness; and
  designating the flow for possible sanction in the event that the greediness is not in accordance with the acceptable greediness;
  characterised in that said measure indicative of acceptable greediness is determined in dependence on the expected greediness of a flow conforming to the reference rate adaptation policy associated with said network service and experiencing substantially similar path conditions.

According to a related aspect of the invention, there is also provided apparatus for policing flow in a data network, said apparatus comprising means for carrying out the steps for implementing methods according to the first aspect above.

Flow in a data network can in general be regarded as comprising a plurality of messages, these being the individual data-carrying items applicable to the network and/or protocol in question. Where such a policing method is used in relation to current Internet Protocol (IP), it will be understood that the messages will in general be IP packets.

If fields in messages or packets arrive at network elements carrying a prediction of their downstream path (as was shown to be possible in the co-pending application referred to above having publication number WO2005/096566), it further becomes possible to police the rate at which they should arrive using these fields. If a dropper is located at the remote egress of the inter-network, as described in the co-pending application referred to above having publication number WO2005/109783, it becomes possible to force, persuade or at least incentivize the sender not to understate downstream congestion or delay.

Host-based rate control algorithms maintain state about the recent condition of each flow's path, which determines the sending rate. For instance, TCP maintains a congestion window variable while TCP-friendly rate control and Kelly's algorithm maintain a variable holding the current sending rate.

Once path characterization arrives at a network element in each packet, the element can maintain its own path state for each flow. Then it can derive its own view of how fast the flow should transmit. It can use this to shape the rate of the flow by buffering packets, but it is preferred for it to merely check that the source is correctly adapting its rate in response to the changing path, termed policing. We have already said that schemes that require per flow state to be held on network elements are less preferable. It would be less problematic, however, for an edge access router to hold per flow state as it already maintains state for each access customer (such as the customer's allowed maximum rate).

Similarly, it is not sufficient to take bottleneck policing approaches, such as those proposed by Floyd and Fall (see [4] above), because they are not able to police the throughput of flows crossing multiple bottlenecks. Furthermore, Clerget et al's TUF approach (see [17] above) doesn't provide adequate inter-class fairness. The path-specific approach proposed according to embodiments of the present invention is capable of addressing these shortcoming by ensuring that all traffic sent over a given network service may be benchmarked on the same reference: the throughput a compliant flow would have for the rate adaptation policy agreed for this network service (e.g. TCP rate adaptation).

FIGS. 1(a) and 1(b) outline the difference between bottleneck policers (FIG. 1(a)) and a path-specific policer of the type we propose in an exemplary embodiment (FIG. 1(b)). We illustrate the difference specifically for a congestion metric, although the same concept can be used for other metrics too. We consider a flow between source S and destination D crossing four network nodes with local congestion $m_1$, $m_2$, $m_3$, $m_4$. Policing nodes are represented with the local level of congestion "$m_i$" and the information "y" upon which they will perform the policing. We define as "x(y)" the throughput they are designed to let through.

For bottleneck policers, $y=m_i$, which means a policer is required on every potential bottleneck, that is every router on the path. The effect of each bottleneck policer is:

$$x_i = \min(x_{i-1}, x(m))$$

which gives an overall effect $x_n = \min(x_0, x(m_1), x(m_2), \ldots, x(m_n))$. We must further note that x(m) is a decreasing function, therefore:

$$\min(x(m_i)) = x(\max(m_i))$$

which means that the overall effect is the effect of the worst bottleneck alone.

On the other hand, for the path-specific policer, y=M, the end-to-end congestion level. In that case, instead of having a throughput adjustment at each network node ($x_0$, $x_1$, ..., $x_4$) there is only one potential throughput adjustment from $x_S$ to $x_D$.

To alleviate the state requirements of the path-specific solution, below we describe alternative embodiments of the present invention, which require less state. The trade-off may be between how much state should be maintained and how fast the policer can detect misbehaving flows. A misbehaving flow may be defined as a flow that uses significantly more bandwidth than would a compliant flow given the same path conditions. According to preferred embodiments of the invention, it is proposed to detect misbehaving flows by recording the flow description of packets in the stream, with a probability in inverse proportion to their expected throughput. Equation (1) (see above) is used as an example of how expected throughput may be determined, noting that is based on the specific path characterization values obtained from the packet. If a flow is consistently more greedy in its rate adaptation than is allowed or deemed acceptable, it will appear much more often in, the polling record and can be singled out for sanction (which may simply involve marking as a warning, but may include more punitive action such as declassing, dropping, etc. . . . ) possibly after a period of further scrutiny.

The allowed rate adaptation algorithm may be the standard one of TCP, or alternatively some other algorithm agreed between the sender and the ingress network operator, such as those of MulTCP or Kelly. In these latter cases, the weight parameter ω or willingness to pay parameter w may need to be part of the agreement between sender and ingress network. This parameter could be associated with a class of traffic, with certain flow identifiers, with a certain type of access interface, or with some field carried in some or all of the packets. This agreement might be signalled as and when a parameter is needed, or agreed contractually over long time periods.

A specific aspect by virtue of which preferred embodiments differ from prior art schemes is that misbehaving flows are not characterised only because of their absolute throughput, but rather on their throughput relative to that a compliant flow would get with the same network conditions on the data path. This is much more accurate in selecting which flows to sanction.

In addition to the above mechanism which ensures each flow is responsive to congestion, a further mechanism should preferably operate at the granularity of each sending user, rather than each flow. A "per user" counter should be maintained of the accumulated total of all the congestion values from packets probabilistically selected for the polling record. Then this counter can be used to weight the "per flow" algorithms more harshly against users who cause more congestion.

Without this addition, it would be possible for users to circumvent the per-flow policer by simply splitting a single misbehaving flow into multiple well-behaved flows to the same destination. Also two senders might always ensure flows are compliant, but one might continuously fill its access line with compliant flows while the other might be an occasional user.

This adaptation of a policer's strictness with long term behaviour ensures heavy users can still send at a high rate, but only into paths with low congestion or where the path is short. Whereas light users will be allowed to send at the full TCP rate at all times. This leads to advantageous differences over what is possible using embodiments of a scheme set out in another co-pending application filed by the present applicant having publication number WO2005/032068 (U.S. Ser. No.

10/572,965), which uses data volume as the metric for determining sanctions (whether sent during peaks or troughs in utilization) and limits data access rate as the sanction (even if sending into an uncongested path).

As explained above, we have shown that by using the "re-feedback" concept, it is possible to detect and remove traffic at the network ingress that doesn't respond to congestion in the manner that TCP should, solely by inspecting network layer headers, using IP unchanged across unmodified core and border routers. Thus if an Internet service-provider wishes to charge for VoIP or video, users may be prevented from being able to benefit by hiding their unresponsive traffic in with best-effort to avoid the charges (e.g. using encrypted "Skype" peer-to-peer—see www.skype.com).

In order to overcome such problems, it is not sufficient to use rate policers such as those available from vendors such as Sandvine or Riverhead Networks (see above). It is certainly desirable to be able to limit the rate, and hence the value that lower-tier customers can derive from a network. But such limits represent the maximum under the best conditions. To maximize the value all customers derive from a network and to balance revenues and the costs of interconnect with other networks, the allowed rate should further depend on path conditions across the whole or any relevant part of the inter-network.

It is also not sufficient to use deep packet inspection (DPI) to detect misbehaving flows, because misbehavior may be concerned with the rate at which packets arrive, rather than with the data they carry. A packet may label itself as TCP, but not behave in compliance with the TCP algorithm. Similarly, a packet may label itself as UDP or Skype or whatever, but be sent using an algorithm friendly to TCP.

Using a policer according to a preferred embodiment of the present invention, it is made possible to push back harder the more congestion people cause cumulatively over periods, measured in days for example. So use of the network for high-bandwidth activities such as p2p file-sharing can be pushed into the troughs and off the peaks at the network edge.

Further, coupled where necessary with the "re-feedback" concept referred to above, edge network devices according to preferred embodiments of the present invention can police any desired congestion response, not just TCP, thereby enabling inter-provider QoS to be carried out by carrying out policing solely at the very edges of the Internet.

BRIEF DESCRIPTION OF THE DRAWINGS

Preferred embodiments of the invention will now be described in more detail with reference to the accompanying drawings, in which:

FIGS. 1(a) and 1(b) outline a fundamental difference between bottleneck policers (FIG. 1(a)) and a path-specific policer (FIG. 1(b)) operating according to an exemplary embodiment of the present invention;

FIGS. 2(a) and 2(b) show graphs indicating potential differences in policing behaviour between a classic policer (FIG. 2(a)) and a path-specific policer operating according to a preferred embodiment of the present invention (FIG. 2(b));

DETAILED DESCRIPTION OF EXEMPLARY EMBODIMENTS

Detection of Potential Abusers

Definitions And Notations

Figure 3:
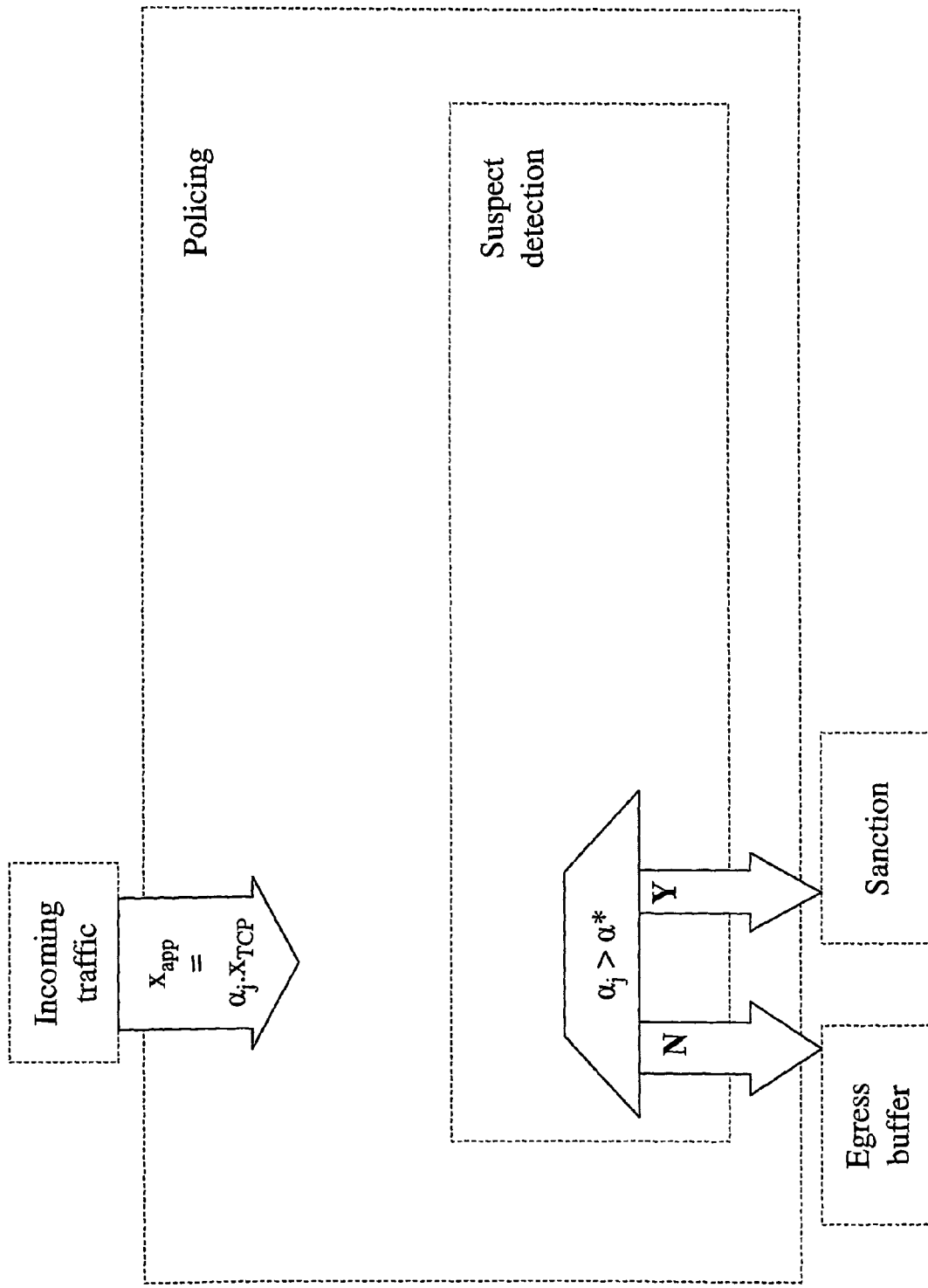
FIG. 3 is a diagram showing a policer according to a comparatively generic embodiment of the present invention.

We consider a node in a "re-feedback" network. Flows $1 \ldots j \ldots J$ send packets $1 \ldots i \ldots N_j$ between times $t=0$ and $t=\tau$, characterizing the observation period. Implicitly, notations J and $N_j$ depend on $\tau$. We consider the situation where sources are saturated with payload data, and therefore send as many packets as they possibly can, according to their compliant rate adaptation policy for behaving sources, or to their excessive bandwidth usage for misbehaving sources.

We define $x_{app}$, the apparent throughput for flow j over period $\tau$, as the ratio between the volume of data sent over the observation period, given by Equation (3)

$$x_{app} = \frac{\sum s_{j,i}}{t_{j,N_j} - t_{j,1}} \qquad (3)$$

where $s_{j,i}$ and $t_{j,i}$ are the size and arrival time of packet i of flow j.

In today's Internet, most flows would be expected to be TCP-compliant and their long-term throughput would never be expected to exceed that of a concurrent TCP flow experiencing the same path conditions for too long. This TCP-equivalent rate is given by Equation (1) which we repeat here as Equation (4).

$$x_{TCP} = \frac{s}{k_{TCP} \cdot T \cdot \sqrt{m}} \qquad (4)$$

where s, T, and m are respectively the average values over $\tau$ for the packet size, the round-trip-time and the end-to-end congestion level, and $k_{TCP}=1/\sqrt{1.5}$.

In the future, other rate adaptation policies may become as common, which would result in a different expression of the long-term expected throughput $x_{\#}=f(T,m,s)$ with respect of the path and flow characteristic.

We would use $x_{\#}$ as a reference compliant rate for policing the traffic with respect to the conditions of the path they follow, where # denotes the rate adaptation policy used for that class of traffic. $x_{TCP}$ becomes a special case of $x_{\#}$.

An example of such an alternative rate adaptation defined by Kelly assumes users with a constant willingness-to-pay, in a context where a fixed price may be charged for each congestion mark detected in the flow. The expected long-term throughput for a flow using that rate adaptation policy is characterised by Equation (2) (see earlier).

We finally define the apparent greediness $\alpha_j$ of a flow as the ratio between its apparent rate $x_{app}$ and its expected compliant rate $x_{\#}$, as given in Equation (5)

$$\alpha_j = \frac{x_{app}}{x_{\#}} \quad (5)$$

Note that the expected greediness of a flow compliant to the rate adaptation policy against which it is policed is 1.

In order to perform path-specific policing, we also define the compliant greediness $\alpha_{\#}$ and the ceiling greediness $\alpha^*$. If the greediness $\alpha_j$ of flow j reaches $\alpha^*$ for a period of time longer than a reference period $T^*$, the flow will be considered incompliant, and submitted to further scrutiny and sanction.

For the simplicity of the presentation but without loss of generality, we will only describe the policer in the context of TCP rate adaptation in the remainder of the document, and thus set $x_{\#}=x_{TCP}$ and $\alpha_{\#}=\alpha_{TCP}$.

Design of the Path-Specific Policer
Generic Objective of the Policer

FIG. 3 outlines the objective of the policer: it has to flag any flow whose apparent greediness $\alpha_j$ is higher than the ceiling $\alpha^*$ for a period of time $T^*$. Flow j arrives at the policer at a rate $x_{app}$. The effect of the policer is to identify whether the flow is behaving ($\alpha_j<\alpha^*$) or misbehaving ($\alpha_j>\alpha^*$) and to segregate their subsequent treatment based on that information.

The value of $x_{TCP}$ has to be maintained per flow and can be updated whenever a packet is received. For instance, $x_{TCP}$ may be obtained for each packet from the re-feedback fields thanks to Equation (4). We describe below several mechanisms to monitor $\alpha_j$ per flow, and segregate for sanction those flows with a greediness higher than the ceiling $\alpha^*$ for a period of time $T^*$.

Note that the exact definition of the flow is left open. Preferably, it would be the packets of an end-to-end connection, as identified by the source and destination addresses and ports. It may also be an aggregate of such connections: for instance, all connections incoming on a given interface of the policer and destined to an IP prefix.

A difference with respect to current "classic" policers, which may be of one of the types referred to above as "bottleneck policers", is outlined in FIG. 2. Until now, policers single out suspect flows on the basis of their apparent rate only, irrespective of the conditions (transmission delay, congestion . . . ) of the path they follow. This is not efficient in policing flows that follow a path-specific rate adaptation policy, and in particular TCP flows, which constitute the large majority of current Internet traffic. FIG. 2 shows this distinction. While high-rate flows experiencing bad path conditions (characterised by long round-trip times and/or high congestion for instance) are caught with both a classic policer (FIG. 2(a)) and a path-specific policer (FIG. 2(b)) (see zone 1 in each figure), and while low-rate flows experiencing good path conditions are let through in both cases again (zone 2), classic policers would wrongly characterise two categories of flows:

in zone 3, a classic policer will not categorise as misbehaving some flows with a throughput not so high in absolute terms, but already too high given the unfavourable path conditions, while a path-specific policer would catch it,
 in zone 4, a classic policer will categorise as misbehaving some flows with very high throughput in absolute terms, but perfectly acceptable given the very favourable path conditions, while a path-specific policer would let them through.

Another significant difference is that existing policers have to be deployed at all the potential points of congestion in the network. Embodiments of the invention allow instead for the policing to be performed at the upstream edge of the network, therefore enabling a more efficient protection of the network.

Token-bucket Policer

Figure 4:
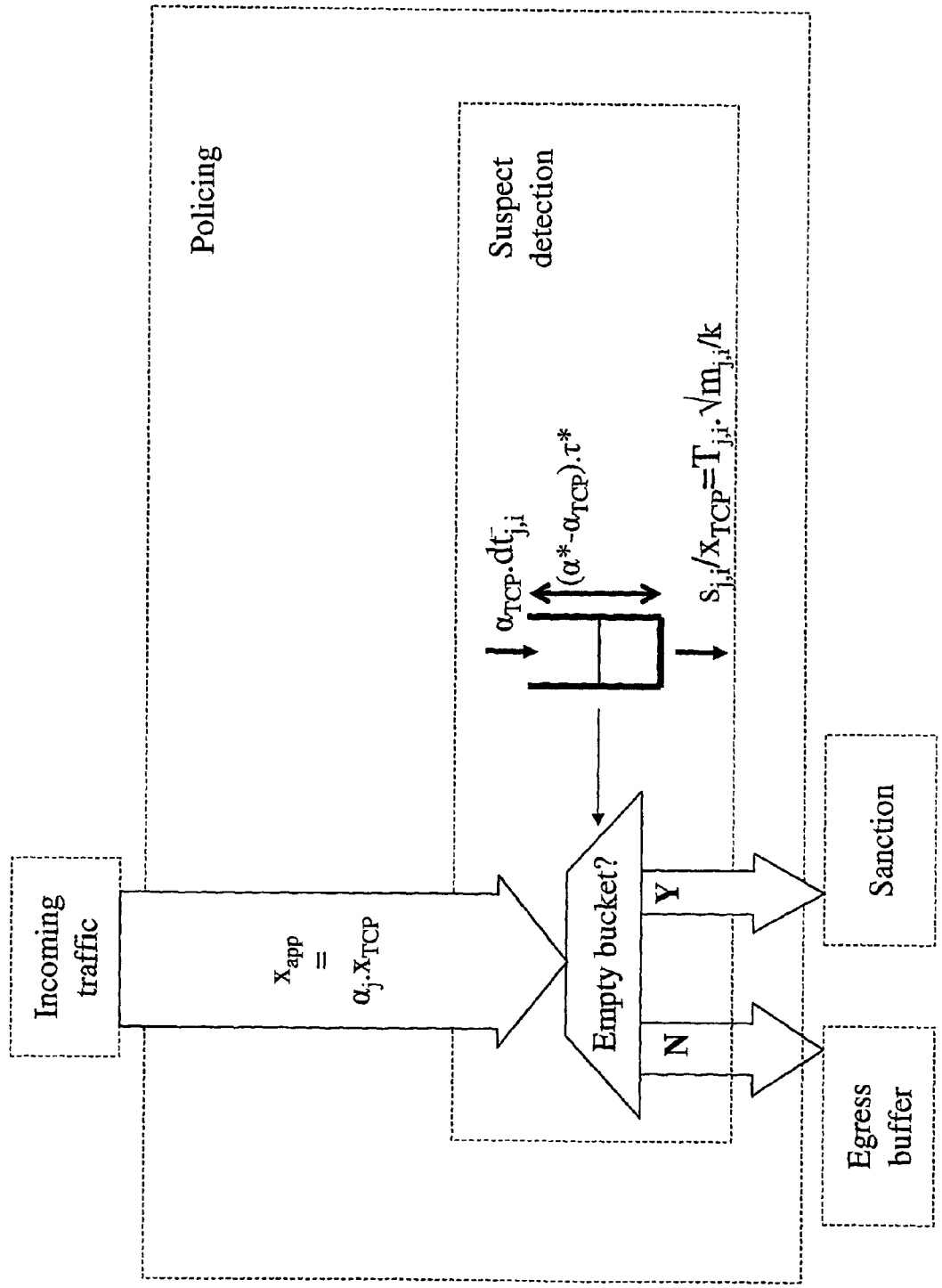
FIG. 4 is a diagram showing a policer operating according to an embodiment of the present invention, using the model of a token bucket of fixed depth.

A possible mechanism is to monitor the cumulative discrepancy between the greediness $\alpha_j$ of the flow and the expected greediness $\alpha_{TCP}=1$ of a compliant flow in the same path conditions. FIG. 4 shows how this can be done by means of a token bucket. Whenever a packet arrives, $\alpha_{TCP}.dt_{j,i}$ is added to the token bucket (where $dt_{j,i}$ is the inter-arrival time since the last packet), while $k_{TCP}.T_{j,i}.\sqrt{m_{j,i}}$ is taken out of it (where $T_{j,i}$ and $m_{j,i}$ are obtained from the fields in the packet). If the bucket is not empty after the adjustment, the packet is served as requested. If on the other hand the bucket is empty, the flow is flagged for sanction and the packet is dealt with appropriately.

Figure 6:
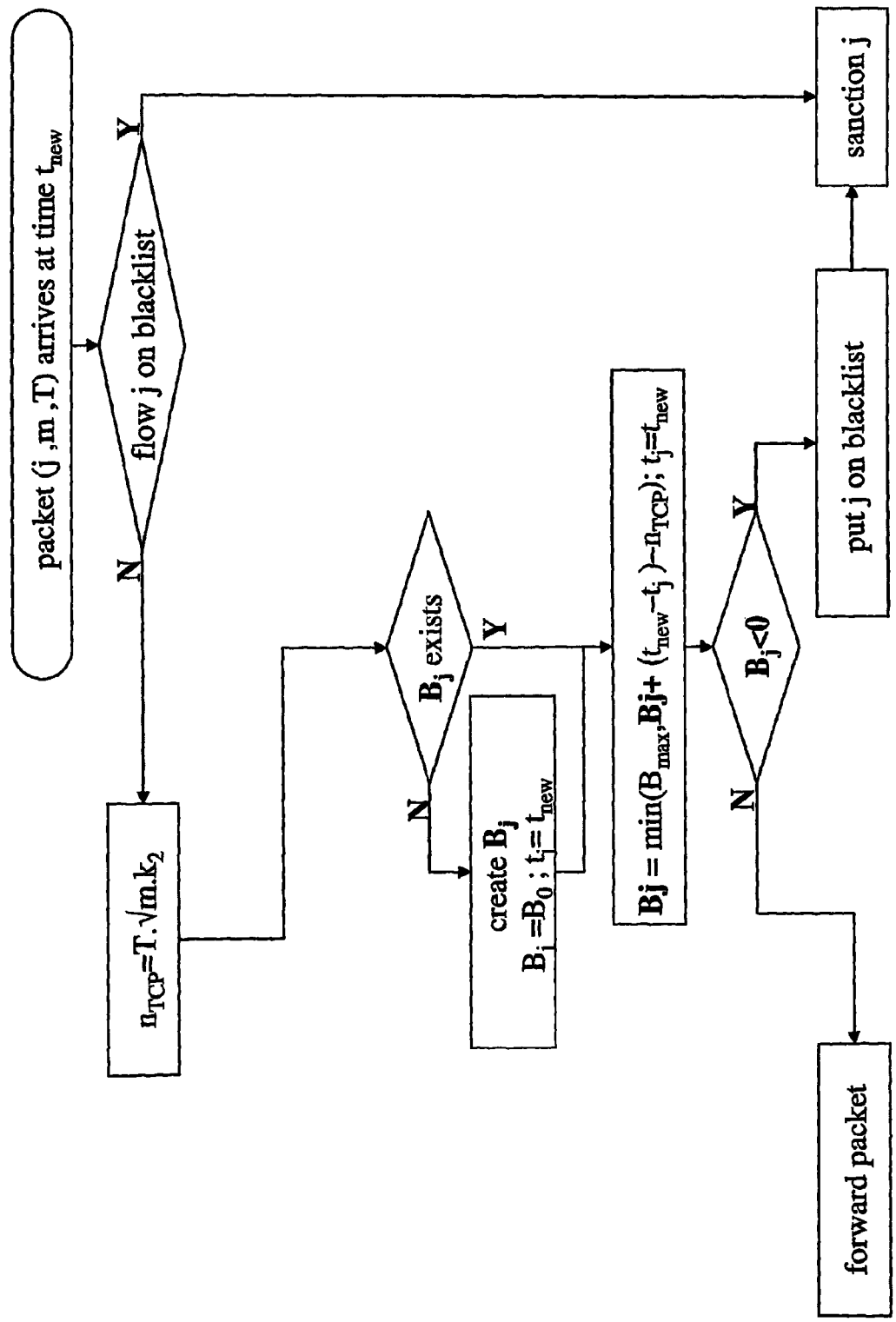
FIG. 6 is a flow-chart showing steps taken by a policer operating according to an embodiment of the present invention wherein greediness is monitored without sampling traffic.

FIG. 6 describes the flow chart related to FIG. 4. When a packet arrives, it is associated with its flow id j, the downstream congestion metric $m_{j,i}$, the round-trip time $T_{j,i}$ and the time $t_{new}$ when it is received. First, the policer checks whether the flow is on the blacklist (no flow is on the blacklist at first). If it is not on the blacklist, the policer determines $n_{TCP}=k_{TCP}.T_{j,i}.\sqrt{m_{j,i}}$. If a bucket $B_j$ doesn't exist for this flow, the policer creates one, and initialises the number of tokens in it $B_j=B_0$ and the time of the last update $t_j=t_{new}$.

Then in all cases the number of tokens in the flow is adjusted by adding $t_{new}-t_j-n_{TCP}$ and capped by $B_{max}$. We recommend $B_{max}=B_0=B$ as given in Equation 6 (see below). The final step is to check that the bucket is not empty at the end of this operation. If $B_j<0$ the flow id is blacklisted and the packet is treated for sanction, while if $B_j>0$ the packet is processed normally.

Determining $n_{TCP}$ is not a very simple computational operation as it may require extracting a square root (or a cubic root, as explained in the section dealing with "Obtaining the path metrics"). Therefore, if the implementation of the policer is required to minimise delay in forwarding packets, the order of operation may be different. First the number of tokens in the bucket would be checked. If $B_j>0$, the packet would be forwarded immediately. Updating the state of the token bucket would be done offline, but quickly enough so that the update occurs within a round-trip time. The delay minimization in the packet processing may come at the expense of responsiveness, as it may take longer to detect misbehaving flows.

When packet i of flow j arrives, the bucket fill is adjusted by $(+\alpha_{TCP}.dt_{j,i}-T_{j,i}.\sqrt{m_{j,i}}/k)$. The cumulative adjustment over period T is $\text{sum}_{i=1 \ldots Nj}(+\alpha_{TCP}.dt_{j,i}-k_{TCP}.T_{j,i}.\sqrt{m_{j,i}})$ which is equivalent to $(\alpha_{TCP}-\alpha_j).T$. (see Annex A1)

For a full-speed TCP flow, $\text{Exp}[\text{sum}_{i=1 \ldots Nj}(+\alpha_{TCP}.dt_{j,i}-T_{j,i}.\sqrt{m_{j,i}}/k)]=(\alpha_{TCP}-\alpha_{TCP}).T=0$ and the trend will be for the number of tokens to oscillate around its starting position.

The bucket for an unsaturated TCP-friendly flow ($\alpha_j<\alpha_{TCP}$) will fill up linearly until saturation, because $\text{Exp}[\text{sum}_{i=1 \ldots Nj}(+\alpha_{TCP}.dt_{j,i}-k_{TCP}.T_{j,i}.\sqrt{m_{j,i}})]=(\alpha_{TCP}-\alpha_i).T>0$.

The bucket for a misbehaving flow ($\alpha_j>\alpha^*$) will empty linearly until no token is left, because $\text{Exp}[\text{sum}_{i=1 \ldots Nj}(+\alpha_{TCP}.dt_{j,i}-k_{TCP}.T_{j,i}.\sqrt{m_{j,i}})]=(\alpha_{TCP}-\alpha_j).T<0$.

The depth of the bucket follows from the objective of the policer. The policer should flag any flow whose apparent greediness $\alpha_j$ is higher than the ceiling $\alpha^*$ for a period of time $T^*$. For such a flow with greediness $\alpha^*$, the bucket should be empty after $T^*$, even if the bucket is full at the start:

$$B+\text{Exp}[\text{sum}_{i=1 \ldots N}(+\alpha_{TCP}.dt_{j,i}-k_{TCP}.T_{j,i}.\sqrt{m_{j,i}})]=B+(\alpha_{TCP}-\alpha^*).T^*=0$$

In other words, the bucket depth B is given by Equation (6)

$$B = (\alpha^* - \alpha_{TCP}) \cdot T^* \qquad (6)$$

Practically, this means that 50% of flows with a greediness α* will be detected after a period of time T*, while only a very small proportion of TCP-compliant packets will be wrongly identified as misbehaving.

Figure 5:
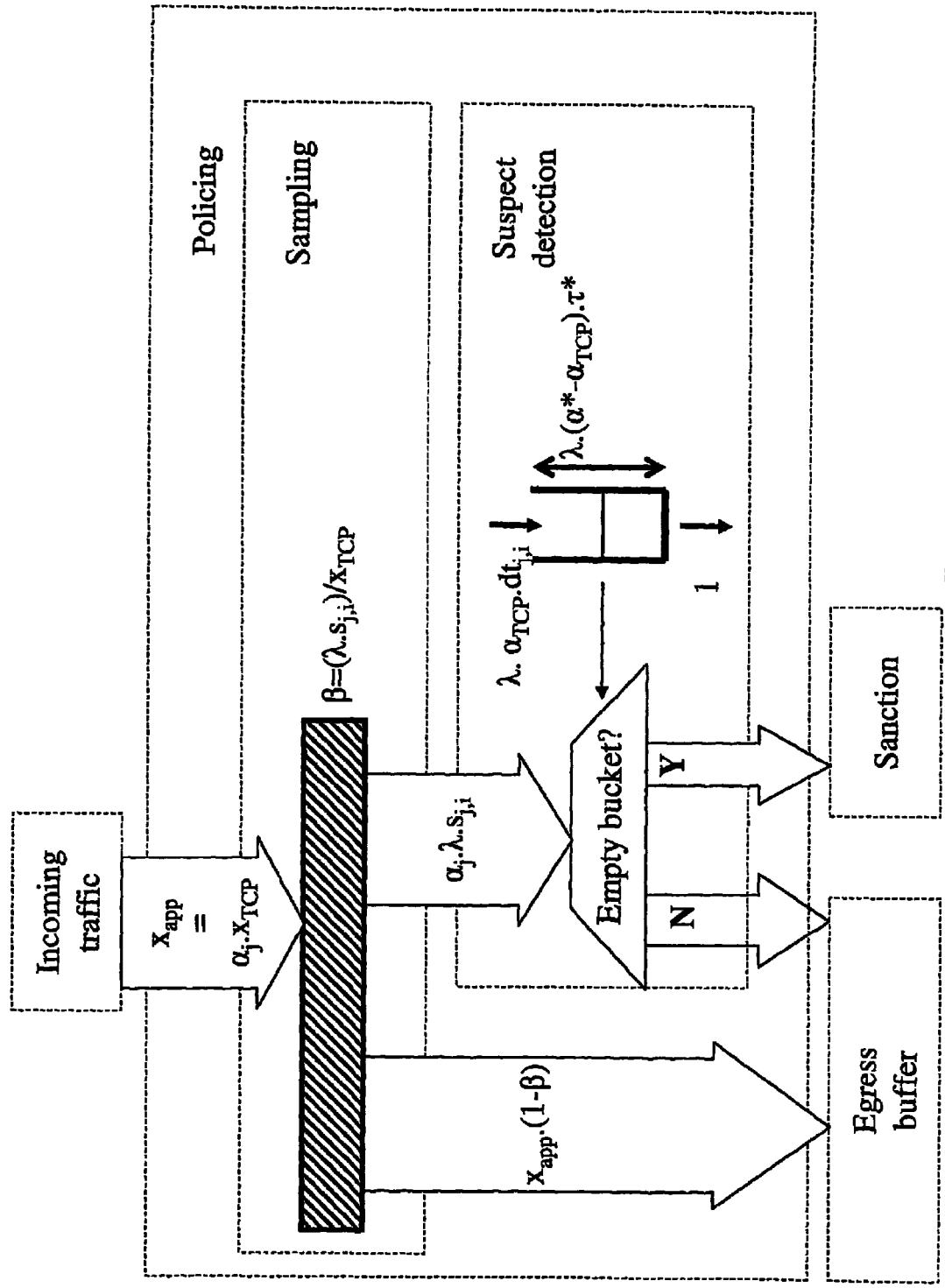
FIG. 5 is a diagram showing a policer operating according to a preferred embodiment of the present invention, wherein greediness is monitored by sampling traffic in inverse proportion to its expected throughput.

Another variant on the design, illustrated in FIG. 5, limits the requirements on per-flow state for small flows. It monitors the greediness by sampling traffic in each flow in inverse proportion to its expected throughput, given by $x_{TCP}$ as previously.

Whenever a packet arrives, a random test is performed. We first draw $u_i$ from a uniform distribution over [0,1]. If $u_i > \lambda.s_{j,i}/x_{TCP}$ where λ is a constant sampling parameter, the packet is served as requested. If $u_i < \lambda.s_{j,i}/x_{TCP}$, $\lambda.\alpha_{TCP}.dt_{j,i}$ is added to the token bucket, while 1 token is drawn out of it—the resulting adjustment is $\lambda.\alpha_{TCP}.dt_{j,i} - 1$. If the bucket is not empty after the adjustment, the packet is served as requested. If on the other hand the bucket is empty, the flow is flagged for sanction and the packet is dealt with appropriately. This time, the cumulative adjustment is equivalent to $\lambda.(\alpha_{TCP} - \alpha_j).T$. (See Annex A2.)

The advantage of the sampling version for the policer is that small compliant flows will not require the creation of a token bucket, which will reduce the state requirement (number of active token buckets) of the policer when compared to a non-sampling embodiment. This feature is important in protecting the policer against denial-of-service attacks.

Figure 7:
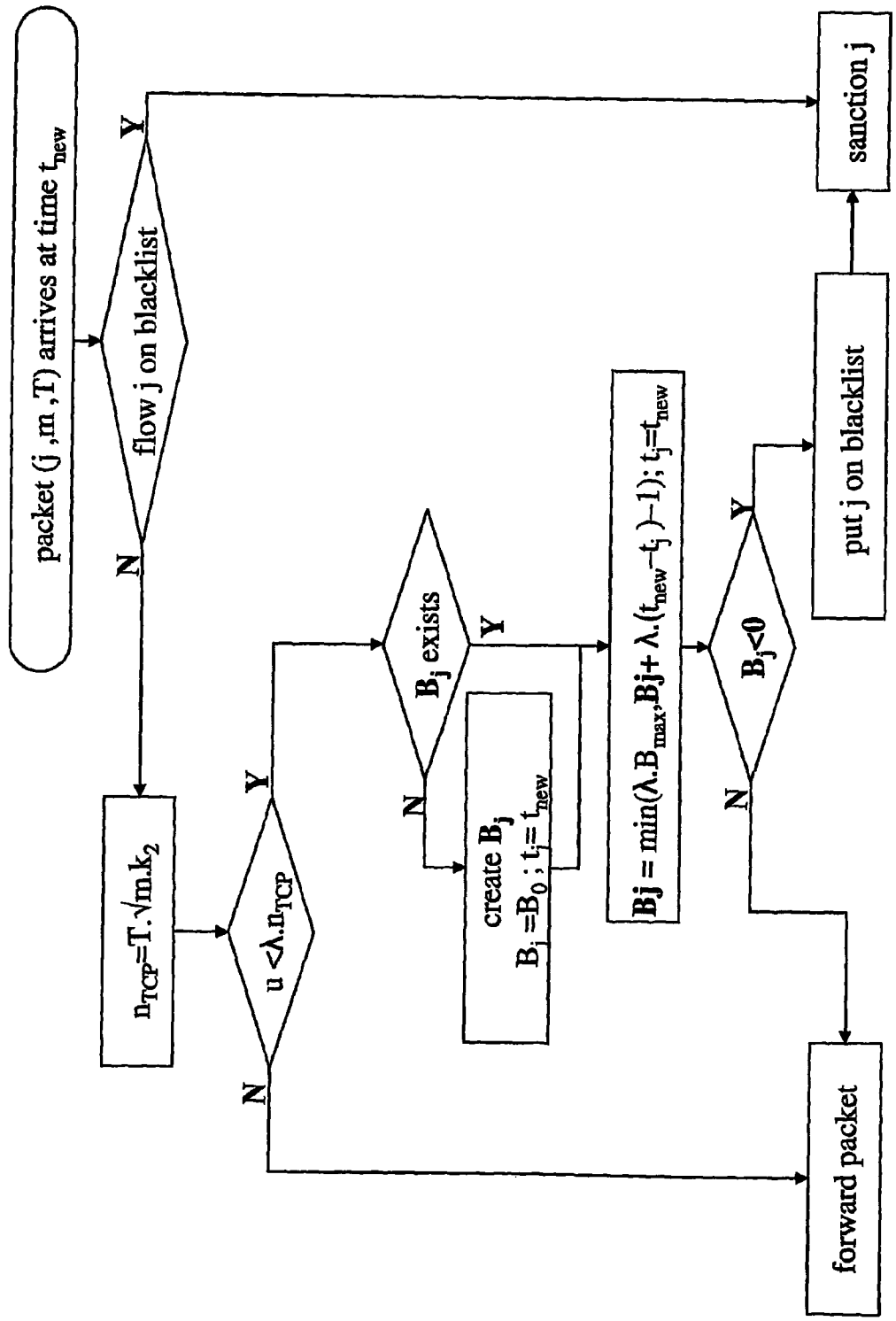
FIG. 7 is a flow-chart showing steps taken by a policer operating according to an embodiment of the present invention wherein greediness is monitored by sampling traffic.

FIG. 7 describes the flow chart related to FIG. 5. When a packet arrives, it is associated with its flow id j, the downstream congestion metric $m_{j,i}$, the round-trip time $T_{j,i}$ and the time $t_{new}$ when it is received. First, the policer checks whether the flow is on the blacklist (no flow is on the blacklist at first). If it is not, the policer determines $n_{TCP} = k_{TCP}.T_{j,i}.\sqrt{m_{j,i}}$. At this stage, a sampling policer selects a random variable $u_i$ picked in the range [0 . . . 1] and compares it to $\lambda.n_{TCP}$. If $u_i > \lambda.n_{TCP}$, the packet is processed for forwarding without further delay. Otherwise, if a bucket $B_j$ doesn't exist for this flow, the policer creates one, and initialises the number of tokens in it $B_j = B_0$ and the time of the last update $t_j = t_{new}$. Then in all cases the number of tokens in the flow is adjusted by adding $\lambda.(t_{new} - t_j) - 1$ and capped by $\lambda.B_{max}$. We recommend $B_{max} = B_0 = B$ as given in Equation 6. The final step is to check that the bucket is not empty at the end of this operation. If $B_j < 0$ the flow id is blacklisted and the packet is treated for sanction, while if $B_j > 0$ the packet is processed normally.

The choice of λ will enable control of the state requirement for the policer. Higher values with spare the policer from creating token buckets for the shortest, most-compliant flows.

Sanction

A wide number of options are possible for treating packets of blacklisted flows, such as:
 they can be dropped;
 they can be demoted to a class of lower priority if one exists;
 they can be marked as a warning for the source to react.

The state of the token bucket $B_j$ may still be updated at that point. One treatment may be applied when the flow has just been blacklisted, a harsher treatment may be applied if the number of tokens in the bucket remains negative, and the flow may be removed from the blacklist when the number of tokens in the bucket becomes positive again (as would happen if the flow drastically reduces its sending rate).

Obtaining the Path Metrics

For that purpose, three values may be extracted from the packet header: the flow id j, the re-feedback congestion field $h_j$, and the re-feedback downstream delay $D_j$.

Preferably the policer should be located close to the ingress of the network. Indeed the re-feedback fields may only characterise the downstream path while end-to-end metrics are required for the compliance test. If the policer is located close to the network ingress, there are two options: either the discrepancy might be ignored because the upstream contribution to the end-to-end metrics can be shown to be negligible, or the upstream contribution could be monitored by the policing node and used together with the downstream metrics in order to obtain the end-to-end metrics. This may require the policing node to keep permanent state of its upstream paths, which may only be manageable at a network ingress where the number of upstream nodes is limited.

In accordance with preferred embodiments, it is proposed to derive $m_j$ from the downstream metric extracted from $h_j$, which is a standard re-feedback operation. This assumes that the upstream network between the ingress access element and the sending host doesn't experience significant congestion.

Note that the value of $m_j$ derived from the re-feedback field will characterise the probability $m_{pkt}$ that a packet gets marked, while Equation (1) requires for m the probability $m_{rtt}$ that one such mark occurs for one or more packets in a round-trip time. It may happen in the future that $m_{pkt}$ is more appropriate, but at the moment $m_{rtt}$ is more appropriate. A close approximation of the relation between these two values is that $m_{rtt} \sim m_{pkt}.cwnd$ where $cwnd = x_{TCP}.T/s = k/m_{rtt}^{(1/2)}$. This leads to $m_{rtt} \sim (k.m_{pkt})^{(2/3)}$.

Also in accordance with preferred embodiments, it is proposed to keep on the policing node a record of the upstream round-trip delay $T_0$ between each upstream source and itself using the minimum of a number of tests at uncongested periods. The round-trip time can be obtained as $T_j = T_0 + 2.D_j$ assuming symmetric routing. Other techniques might be used to retrieve the roundtrip: see for instance Jiang & Dovrolis [20].

[20] Hao Jiang & Constantinos Dovrolis: "Passive estimation of TCP round-trip times", ACM SIGCOMM Computer Communication Review Volume 32, Issue 3 (July 2002).

Setting the Ceiling Conditions

Below, we outline how α* should be chosen in order to achieve a sufficient level of robustness (by putting a tight upper limit to the proportion of compliant flows that may be deemed as misbehaving).

The ceiling greediness α* is the main control parameter of the policer. Its choice is key in setting the trade-off between responsiveness (detecting misbehaving flows quickly) and robustness (identifying as misbehaving as few compliant flows as possible) of the policer. We explain here how to set α* so that the proportion of compliant flows identified as misbehaving (that is, the proportion of false positives) remains smaller than ε (we would expect ε to take very small values, say $10^{-3}$ at most).

First we show how a should be set if the observation period is the round-trip time $T_j$ of the flow, during which $m_j$ congestion is constant, before showing how this result can be extended to give absolute value for all flows through the policing node.

Figure 8:
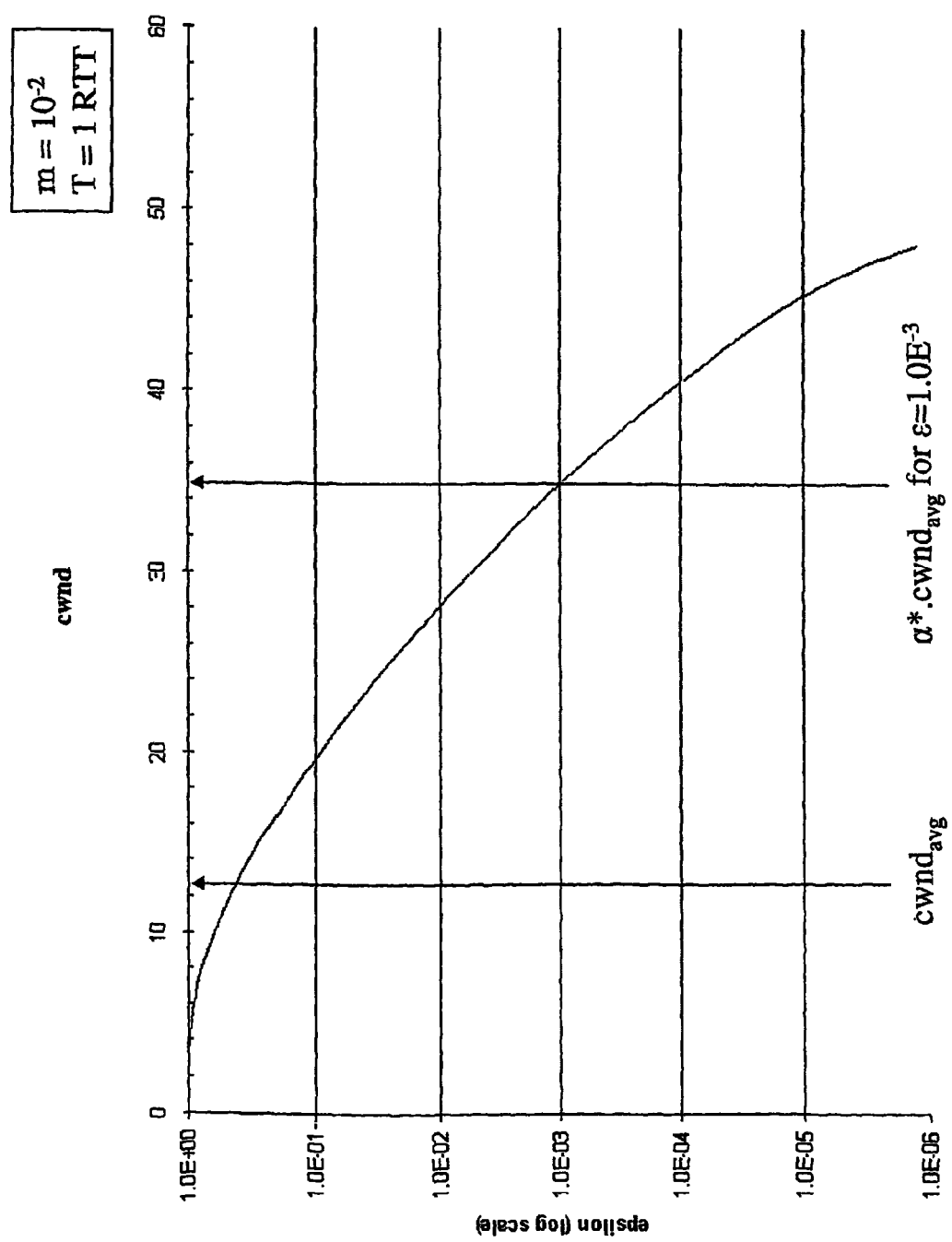
FIG. 8 is a graph showing the expected throughput of a TCP flow through a policer operating in accordance with a preferred embodiment of the invention.

As an example, FIG. 8, which results from modelling TCP's rate adaptation mechanisms as a Markov chain, shows on a log scale the cumulative probability distribution $y = \log(P(cwnd < \varepsilon))$ of the congestion window cwnd of a TCP connection over one round-trip-time $T_j$ for a congestion level $m_j = 10^{-2}$. In effect, this is the expected throughput of a TCP flow over a reference observation period equal to its round-trip time: $T^* = T_j$.

The requirement is for the policer to get a proportion of false positives smaller than ε over T*, α* should therefore be set so that the probability for the congestion window to exceed $\alpha^*$ times the expected average $cwnd_{avg}$ is smaller than $\epsilon$, which is given by $P(cwnd>\alpha^*.cwnd_{avg})<\epsilon$.

FIG. 8 shows how to find $\alpha^*$ when $\epsilon=10^{-3}$. In this example, we get $\alpha^*.cwnd_{avg}\sim 35$ while $cwnd_{avg}\sim 12.7$ (the value of the average comes from analysis of the TCP congestion window as a Markov chain). This gives $\alpha^*\sim 3$ for $\epsilon=10^{-3}$. This means that after T* at least 50% of flows with a greediness higher than $\alpha^*$ will be rightly qualified as misbehaving while no more than 0.1% of TCP-compliant flows will be wrongly identified as misbehaving if the bucket depth is set to $(\alpha^*-\alpha_{TCP}).T^*$. Let the observation period grow and the robustness of the policer will get better (although it will get less responsive).

If the policer is to be dimensioned for responsiveness rather than robustness, then the depth of the bucket should be set to a lower value.

If the sampling version of the policer is to be dimensioned to minimise its state requirement (as defined by the number of buckets necessary to monitor the traffic flowing through), a shorter bucket will reduce the state requirement, as well as a smaller value for the sampling parameter $\lambda$.

Further Embodiment Adjusting the Compliance Test to Each User's Congestion History It is possible to address the above issue by keeping track of the amount of congestion caused by a user over a recent period. For instance, a record of the volume of the congestion $m_k$ resulting from the data sent could be maintained for each user, while the contracted usage over the period $U_k$ is known. Further, estimates of the aggregate usage over all users U and of the resulting congestion M would also be computed. The sampling coefficient $\lambda$ can be adjusted to take into account the ratio $(m_k/U_k)/(M/U)$.

For instance, rather than using the same sampling coefficient $\lambda$ for all users, it is possible to define the sampling coefficient for user k as $\lambda_k=\lambda. \max\{1, (m_k/U_k)/(M/U)\}$ so that data for user k is policed much more strictly when user k has used up the congestion "budget" $(M/U)^*U_k$.

Possible Alternatives

We have proposed in the above sections a design for a rate policer that may detect flows whose rate adaptation need not be responsive to their path characteristics with respect to established rate adaptation principles (the TCP standard). We have illustrated this mechanism for long-lived TCP flows in steady state. As the steady-state throughput is the maximum long-term throughput a compliant TCP flow can achieve, the policer could indeed be effective for any TCP flow. The policer can however use other compliance criteria. For instance the long-term TCP rate formula could be substituted by Kelly's "constant willingness to pay formula" (see Equation (2) above). This would in general require each packet to carry a "willingness-to-pay" field.

Different classes of traffic may also be tested against different compliance formulas by using different classes.

ANNEXES

Analysis on Token Bucket Mechanism

Annex A1

Token Bucket without Sampling

Proposition:
The amount of token in the bucket is equivalent to $(\alpha_{TCP}-\alpha_j).T$ Proof Outline:
Every time a packet arrives, the number of tokens increases by $\alpha_{TCP}.(t_i-t_{i-1})$ and decreases by $T_i.\sqrt{m_i}/k$. After a time T, the bucket will contain $sum_{i=1 \ldots n(T)}(\alpha_{TCP}.(t_i-t_{i-1})-T_i.\sqrt{m_i}/k)$ where $n(T)=N_j(T).T$. The bias of the estimate is:

$$b = sum_{i=1 \ldots n(\tau)}(\alpha_{TCP} \cdot (t_i - t_{i-1})) -$$

$$\quad sum_{i=1 \ldots n(\tau)}(T_i \cdot \sqrt{m_i}/k) - (\alpha_{TCP} - \alpha_j) \cdot \tau$$

$$= \alpha_{TCP} \cdot \tau - sum_{i=1 \ldots n(\tau)}(T_i \cdot \sqrt{m_i}/k) -$$

$$\quad \alpha_{TCP} \cdot \tau + \alpha_j \cdot \tau$$

$$= -sum_{i=1 \ldots n(\tau)}(T_i \cdot \sqrt{m_i}/k) + \alpha_j \cdot \tau$$

$$= -sum_{i=1 \ldots n(\tau)}(T_i \cdot \sqrt{m_i}/k) + (n_{app}/n_{TCP}) \cdot \tau$$

$$= n(\tau) \cdot est(T \cdot \sqrt{m}/k) - sum_{i=1 \ldots n(\tau)}(T_i \cdot \sqrt{m_i}/k) +$$

$$\quad (n_{app}/n_{TCP}) \cdot \tau - n(\tau) \cdot est(T \cdot \sqrt{m}/k)$$

$$= n(\tau) \cdot \{est(T \cdot \sqrt{m}/k) - sum_{i=1 \ldots n(\tau)}(T_i \cdot \sqrt{m_i}/k)/n(\tau)\} +$$

$$\quad n(\tau) \cdot (1/n_{TCP} - est(T \cdot \sqrt{m}/k))$$

$$= +n(\tau) \cdot (1/n_{TCP} - est(T \cdot \sqrt{m}/k)) \text{ by defining } est(T \cdot \sqrt{m}/k)$$

$$= sum_{i=1 \ldots n(\tau)}(T_i \cdot \sqrt{m_i}/k)/n(\tau)$$

So in the end $b=n(T).(1/n_{TCP}-est(T.\sqrt{m}/k))$

In order to get $|b|<\epsilon$ we need to have $n(T).|1/n_{TCP}-est(T.\sqrt{m}/k)|<\epsilon$ By transcribing "$x_{TCP}=k.s/(T.\sqrt{m})$" which is effectively an equivalence, we get:

For any $\epsilon_1$, there exists $T_1$ so that $|1/n_{TCP}-est(T.\sqrt{m}/k)|<\epsilon_1$ If we further assume that $\epsilon_1=O(1/n(T))$, which stresses that the equivalence is stronger for longer flows, we get:

For any $\epsilon_2$, there exists $T_2$ so that $|1/n_{TCP}-est(T.\sqrt{m}/k)|\epsilon_2/n(T_2)$ If we choose $T_2$ so that $\epsilon=\epsilon_2/n(T_2)$, we get $|b|<\epsilon$ and therefore the proposed equivalency.

Note: this doesn't require averaging at the policer. If an exponentially-weighted moving average (EWMA) is used, we could define $est(T.\sqrt{m}/k)=sum_{i=1 \ldots n(T)}(EWMA(T_i.\sqrt{m_i}/k))/n(T)$ instead, and all the rest of the proof is just as relevant. This may not improve the performance of the policer as far as the average is concerned. Most likely, there would be an impact on the performance with respect to the variance.

Annex A2

Token Bucket with Sampling

Proposition:
The amount of tokens in the bucket is equivalent to $(\alpha_{TCP}-\alpha_j).\lambda.T$ Proof Outline:
Very similar. We define $L(T)$ as the number of sampled packets: $L(T)=n(T).\lambda$ $$b = sum_{i=1 \ldots L(\tau)}(\alpha_{TCP} \cdot \lambda \cdot (t_i - t_{i-1})) - sum_{i=1 \ldots L(\tau)}(1) -$$

$$\quad (\alpha_{TCP} - \alpha_j) \cdot \lambda \cdot \tau$$

$$= \alpha_{TCP} \cdot \lambda \cdot \tau - sum_{i=1 \ldots n(\tau)}(u_i) + \alpha_j \cdot \lambda \cdot \tau - \alpha_{TCP}\lambda \cdot \tau$$

$$= -sum_{i=1 \ldots n(\tau)}(u_i) + \alpha_j \cdot \lambda \cdot \tau$$

$$= sum_{i=1 \ldots n(\tau)}(\lambda \cdot T_i \cdot \sqrt{m_i}/k - u_i) -$$

$$\quad sum_{i=1 \ldots n(\tau)}(\lambda \cdot T_i \cdot \sqrt{m_i}/k) + \alpha_j \cdot \lambda \cdot \tau$$

-continued $$= sum_{i=1\ldots n(\tau)}(\lambda \cdot T_i \cdot \sqrt{m_i/k} - u_i) - sum_{i=1\ldots n(\tau)}(\lambda \cdot T_i \cdot \sqrt{m_i/k}) +$$
$$(n_{app}/n_{TCP}) \cdot \lambda \cdot \tau$$
$$= sum_{i=1\ldots n(\tau)}(\lambda \cdot T_i \cdot \sqrt{m_i/k} - u_i) - sum_{i=1\ldots n(\tau)}(\lambda \cdot T_i \cdot \sqrt{m_i/k}) +$$
$$(n_{app}/n_{TCP}) \cdot \lambda \cdot \tau + n(\tau) \cdot \lambda \cdot est(T \cdot \sqrt{m/k}) -$$
$$n(\tau) \cdot \lambda \cdot est(T \cdot \sqrt{m/k})$$
$$= sum_{i=1\ldots n(\tau)}(\lambda \cdot T_i \cdot \sqrt{m_i/k} - u_i) + n(\tau) \cdot \lambda \cdot$$
$$(1/n_{TCP} - est(T \cdot \sqrt{m/k})) + n(\tau) \cdot \lambda \cdot$$
$$\{est(T \cdot \sqrt{m/k}) - sum_{i=1\ldots n(\tau)}(T_i \cdot \sqrt{m_i/k})/n(\tau)\}$$
$$= sum_{i=1\ldots n(\tau)}(\lambda \cdot T_i \cdot \sqrt{m_i/k} - u_i) + n(\tau) \cdot \lambda \cdot$$
$$(1/n_{TCP} - est(T \cdot \sqrt{m/k})) \text{ by defining } est(T \cdot \sqrt{m/k})$$
$$= sum_{i=1\ldots n(\tau)}(T_i \cdot \sqrt{m_i/k})/n(\tau), \text{ as in } A1$$

This time we get $b = \lambda \cdot n(\tau) \cdot (1/n_{TCP} - est(T \cdot \sqrt{m/k})) + sum_{i=1\ldots n(T)}(\lambda \cdot T_i \cdot \sqrt{m_i/k} - u_i)$.

We can choose $T_3$ so that $\epsilon/2 = \epsilon_2/n(T_3)$, for the reasons given in A1.

If moreover $|sum_{i=1\ldots n(T)}(\lambda \cdot T_i \cdot \sqrt{m_i/k} - u_i)| < \epsilon/2$ when $T > T_4$ then $b < \epsilon$ when $T > \max(T_3, T_4)$.

What is claimed is:

1. A method of policing data flow between nodes in a data network through a policing node, said data network providing a network service having an associated reference rate adaptation policy, wherein a data flow conforming to such policy and experiencing particular path conditions would have a particular greediness determinable therefrom, said method comprising using at least one processor at said policing node to:
   determine a measure of greediness of an actual data flow through said policing node;
   establish a measure representing acceptable greediness for a policy-conforming data flow;
   compare said determined measure of greediness with said established measure representing acceptable greediness for such a policy-conforming data flow; and
   designate the actual data flow for possible future sanction in the event that said comparison indicates that the determined greediness of the actual data flow through said policing node is not in accordance with the established acceptable greediness for such a policy-conforming data flow;
   wherein said established measure representing acceptable greediness for such a policy-conforming data flow is established in dependence on an expected greediness, said expected greediness being determined to be that which would be expected for a data flow conforming to the reference rate adaptation policy associated with said network service and experiencing similar path conditions to those being experienced by the actual data flow through said policing node.

2. A method according to claim 1 wherein the flow comprises a plurality of messages.

3. A method according to claim 2 wherein said messages are data packets.

4. A method according to claim 2 wherein said messages carry information indicative of one or more characteristics of a path used by the messages in traversing a data network.

5. A method according to claim 4 wherein said messages carry information indicative of a characteristic of an end-to-end path in said data network.

6. A method according to claim 4 wherein said messages carry information indicative of a characteristic of a downstream path in said data network.

7. A method according to claim 4 wherein said messages carry information indicative of congestion.

8. A method according to claim 4 wherein said messages carry information indicative of a round-trip time (RTT) for messages traversing said path in said data network.

9. A method according to claim 2, further comprising a step of selecting one or more messages from said data flow, wherein said step of comparing is performed in relation to said selected messages.

10. A method according to claim 9, wherein the probability of a particular message being selected from said data flow is dependent on the greediness of said data flow.

11. A method according to claim 1, wherein said measure of greediness is determined in dependence on a rate adaptation policy of said data flow.

12. A method according to claim 1, wherein said expected greediness is determined with reference to a measure of greediness of a TCP-compliant flow.

13. A method according to claim 1, wherein said measure indicative of acceptable greediness is determined with reference to a desired level of robustness of a policing node when performing the method.

14. A method according to claim 1, wherein said measure indicative of acceptable greediness is determined with reference to a desired level of responsiveness of a policing node when performing the method.

15. A method according to claim 1, wherein said measure indicative of acceptable greediness is determined with reference to state requirements of a policing node when performing the method.

16. A method according to claim 1, wherein said step of designating the data flow for possible sanction is taken in the event that the greediness of the data flow passes a threshold level of acceptable greediness.

17. A method according to claim 1, wherein the likelihood of said step of designating a data flow for possible sanction being taken is dependent on a measure of disparity between said greediness and said acceptable greediness.

18. A method according to claim 1, wherein the severity of any possible sanction for which a data flow is designated is dependent on a measure of disparity between said greediness and said acceptable greediness.

19. A method according to claim 1, further comprising a step of taking action in relation to data flows designated for possible sanction.

20. A method according to claim 19, wherein said action comprises dropping one or more messages from one or more data flows designated for possible sanction.

21. A method according to claim 19, wherein said action comprises demoting one or more messages from one or more data flows designated for possible sanction to a traffic class having a lower priority.

22. A method according to claim 19, wherein said action comprises marking one or more messages from one or more data flows designated for possible sanction.

23. A method according to claim 22, wherein said action of marking comprises marking messages with a notification to a source of said data flows indicating that further sanction may be taken in the event that said source fails to react appropriately to said marking.

24. A method according to claim 19, wherein said action comprises delaying one or more subsequent messages from one or more data flows designated for possible sanction.

25. A method according to claim 19, wherein said action comprises subjecting one or more data flows designated for possible sanction to rate control.

26. A method according to claim 1, wherein said measure indicative of acceptable greediness in respect of a data flow may be varied in dependence on a measure of past behaviour in respect of said data flow.

27. A method according to claim 1, wherein the severity and/or likelihood of any possible sanction in respect of a data flow may be varied in dependence on a measure of past behaviour in respect of said data flow.

28. A method according to claim 1, wherein said measure indicative of acceptable greediness and/or said expected greediness in respect of a data flow may be varied in dependence on a class of traffic of said data flow.

29. Apparatus for policing data flow between nodes in a data network, said data network providing a network service having an associated reference rate adaptation policy, wherein a data flow conforming to such policy and experiencing particular path conditions would have a particular greediness determinable therefrom, said apparatus comprising:

a policing node including at least one processor configured to provide:

means for determining a measure of greediness of an actual data flow through said policing node;

means for establishing a measure representing acceptable greediness for a policy-conforming data flow;

means for comparing said determined measure of greediness with said established measure representing acceptable greediness for such a policy-conforming data flow; and means for designating the actual data flow for possible future sanction in the event that said comparison indicates that the determined greediness of the actual data flow through said policing node is not in accordance with the established acceptable greediness for such a policy-conforming data flow;

wherein said established measure representing acceptable greediness for such a policy-conforming data flow is established in dependence on an expected greediness, said expected greediness being determined to be that which would be expected for a data flow conforming to the reference rate adaptation policy associated with said network service and experiencing similar path conditions to those being experienced by the actual data flow through said policing node.

\* \* \* \* \*